(12) United States Patent
Choi

(10) Patent No.: US 12,316,583 B2
(45) Date of Patent: May 27, 2025

(54) ELECTRONIC APPARATUS AND METHOD TO GENERATE RESPONSE INFORMATION BASED ON CONVERSATION CONTENT

(71) Applicant: SAMSUNG ELECTRONICS CO., LTD., Suwon-si (KR)

(72) Inventor: Sungja Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/387,700

(22) Filed: Nov. 7, 2023

(65) Prior Publication Data

US 2024/0106767 A1 Mar. 28, 2024

Related U.S. Application Data

(63) Continuation of application No. PCT/KR2023/013910, filed on Sep. 15, 2023.

(30) Foreign Application Priority Data

Sep. 23, 2022 (KR) ........................ 10-2022-0121157

(51) Int. Cl.
*H04L 51/02* (2022.01)
*H04L 51/216* (2022.01)

(52) U.S. Cl.
CPC ............ *H04L 51/02* (2013.01); *H04L 51/216* (2022.05)

(58) Field of Classification Search
CPC ... H04L 51/02; H04L 51/216; G10L 15/1822; G06F 40/35

(Continued)

(56) References Cited

U.S. PATENT DOCUMENTS 9,978,361 B2 5/2018 Sarikaya et al.
10,185,542 B2 1/2019 Carson et al.
(Continued)

FOREIGN PATENT DOCUMENTS

KR 10-2016-0004351 A 1/2016
KR 10-2020-0000155 A 1/2020
(Continued)

OTHER PUBLICATIONS

Communication dated Dec. 21, 2023, issued by the International Searching Authority in counterpart International Application No. PCT/KR2023/013910 (PCT/ISA/210).
(Continued)

*Primary Examiner* — Tan Doan
(74) *Attorney, Agent, or Firm* — Sughrue Mion, PLLC

(57) ABSTRACT

An electronic apparatus may include a communication interface, a memory configured to store at least one instruction, and one or more processors configured to generate response information based on conversation content received through the communication interface by executing the at least one instruction to: identify a user request by confirming a current request and a previous request of a user in the conversation content, identify whether the user request is a multi-turn request or a single-turn request based on the conversation content, generate a confirmation request to request the user to confirm the user request based on the user request being identified as the single-turn request, and omit a generation of the confirmation request and generate a response corresponding to the user request based on the user request being identified as the multi-turn request.

17 Claims, 14 Drawing Sheets

(58) Field of Classification Search
USPC .......................................................... 709/206
See application file for complete search history.

(56) References Cited

U.S. PATENT DOCUMENTS

| | | | |
|---|---|---|---|
| 10,636,424 B2 | 4/2020 | Piernot et al. | |
| 10,937,424 B2 | 3/2021 | Park et al. | |
| 11,048,473 B2 | 6/2021 | Carson et al. | |
| 11,495,220 B2 | 11/2022 | Lee et al. | |
| 12,073,147 B2 | 8/2024 | Carson et al. | |
| 2010/0153325 A1* | 6/2010 | Amoroso | G06Q 10/107 706/46 |
| 2014/0365885 A1 | 12/2014 | Carson et al. | |
| 2017/0140754 A1 | 5/2017 | Ichimura | |
| 2019/0019505 A1* | 1/2019 | Nicholson | H04L 51/02 |
| 2019/0095171 A1 | 3/2019 | Carson et al. | |
| 2019/0164546 A1 | 5/2019 | Piernot et al. | |
| 2019/0378508 A1 | 12/2019 | Touyama | |
| 2019/0392827 A1 | 12/2019 | Park et al. | |
| 2020/0175985 A1* | 6/2020 | Lee | G10L 15/26 |
| 2020/0234700 A1 | 7/2020 | Heltewig et al. | |
| 2021/0193176 A1 | 6/2021 | Doshi et al. | |
| 2021/0294571 A1 | 9/2021 | Carson et al. | |
| 2022/0199079 A1* | 6/2022 | Hanson | H04L 51/02 |
| 2022/0215180 A1* | 7/2022 | Hu | G06F 16/3344 |
| 2023/0050159 A1 | 2/2023 | Lee et al. | |

FOREIGN PATENT DOCUMENTS

| | | |
|---|---|---|
| KR | 10-2020-0065085 A | 6/2020 |
| KR | 10-2020-0066933 A | 6/2020 |

OTHER PUBLICATIONS

Communication dated Dec. 21, 2023, issued by the International Searching Authority in counterpart International Application No. PCT/KR2023/013910 (PCT/ISA/237).

* cited by examiner

1000

ELECTRONIC APPARATUS AND METHOD TO GENERATE RESPONSE INFORMATION BASED ON CONVERSATION CONTENT

CROSS-REFERENCE TO RELATED APPLICATION

This application is a bypass continuation of International Patent Application No. PCT/KR2023/013910, filed on Sep. 15, 2023, which is based on and claims priority to Korean Patent Application No. 10-2022-0121157, filed on Sep. 23, 2022, in the Korean Intellectual Property Office, the disclosures of which are incorporated by reference herein in their entireties.

BACKGROUND

Field

Apparatuses and methods consistent with the disclosure relate to an electronic apparatus and a control method thereof, and more particularly, to an electronic apparatus for performing voice recognition using a user's conversation history and a control method thereof.

Description of the Related Art

Recently, user requests or commands are confirmed through voice or text input into message applications (or messenger applications, chat applications) or voice recognition applications, and services (e.g., schedule management service, reservation service, shopping service, etc.) corresponding to the confirmed user request are provided.

In order to ensure accurate responses to user requests, it is required to accurately understand the user's intention and command from the text or voice input by the user.

SUMMARY

According to an aspect of the present disclosure, an electronic apparatus may include: a communication interface; a memory configured to store at least one instruction; and one or more processors configured to generate response information based on conversation content received through the communication interface by executing the at least one instruction to: identify a user request by confirming a current request and a previous request of a user in the conversation content; identify whether the user request is a multi-turn request or a single-turn request based on the conversation content; generate a confirmation request to request the user to confirm the user request based on the user request being identified as the single-turn request; and omit a generation of the confirmation request and generate a response corresponding to the user request based on the user request being identified as the multi-turn request.

The one or more processors are further configured to execute the at least one instruction to: identify that the user request is the multi-turn request when a same type of request is identified a predetermined number of times or more for a predetermined time based on the conversation content, and generate the response corresponding to the user request based on the multi-turn request.

The same type of request corresponds to requests for information that fall in a common category, and are directed to different entities or targets.

When a plurality of multi-turn requests are identified, the one or more processors are further configured to execute the at least one instruction to: identify one of the plurality of identified multi-turn requests using a conversation sequence within the received conversation content, and generate the response corresponding to the user request based on the identified one multi-turn request.

When a plurality of user requests are confirmed, the one or more processors are further configured to execute the at least one instruction to estimate one of the plurality of user requests based on reliability values corresponding to each of the plurality of user requests. When the reliability value of the user request is greater than or equal to a threshold value, the response is generated based on the user request.

The one or more processors are further configured to execute the at least one instruction to: generate the confirmation request or the response based on at least one of a user preference for the confirmation request and a user preference for the response.

The one or more processors are further configured to execute the at least one instruction to: acquire a user preference value for the confirmation request based on conversation history information including user feedback information, when the obtained preference value is identified as being less than a threshold value, the response is generated based on the identified request, and the user feedback information includes at least one of feedback information on the response and feedback information on the confirmation request.

The memory further includes user preference information corresponding to different type of requests, respectively. The one or more processors are further configured to execute the at least one instruction to identify a user preference value for a response corresponding to the user request based on the user preference information stored in the memory, and when the user preference value is identified as being greater than or equal to a threshold value, the response is generated based on the user request.

The memory stores a trained first neural network model, the trained first neural network model is trained to output the user request as conversation content, response information, and feedback information for the response are input as training data, and the one or more processors are further configured to execute the at least one instruction to input the conversation content received through the communication interface to the trained first neural network model to estimate the user request.

The user request includes a first user request and a second user request, the one or more processors are further configured to execute the at least one instruction to: estimate the first user request based on the user's current request within the received conversation content, estimate the second user request based on the user's current request and previous request, and generate the confirmation request for identifying either the first user request or the second user request when the first user request and the second user request are identified as different types.

According to another aspect of the present disclosure, a method of controlling an electronic apparatus may include: obtaining a conversation content from a user; identifying a user request by confirming a current request and a previous request of the user in the conversation content; identifying whether the user request is a multi-turn request or a single-turn request based on the conversation content; generating a confirmation request to request the user to confirm the user request based on the user request being identified as the single-turn request; and omitting a generation of the confirmation request and generating a response corresponding to the user request based on the user request being identified as the multi-turn request.

The method may further include: identifying that the user request is the multi-turn request when a same type of request is identified a predetermined number of times or more for a predetermined time based on the conversation content; and generating the response corresponding to the user request based on the multi-turn request.

The same type of request may correspond to requests for information that fall in a common category, and are directed to different entities or targets.

The method may further include: when a plurality of multi-turn requests are identified, identifying one of the plurality of identified multi-turn requests using a conversation sequence within the conversation content, and wherein the generating of the response may include: generating the response based on the one multi-turn request.

The estimating may include: when a plurality of user requests are confirmed, one of the plurality of user requests is estimated based on reliability values corresponding to each of the plurality of user requests, and wherein the generating of the response may include: when the reliability value of the user request is greater than or equal to a threshold value, generating the response based on the user request.

DETAILED DESCRIPTION

Figure 1:
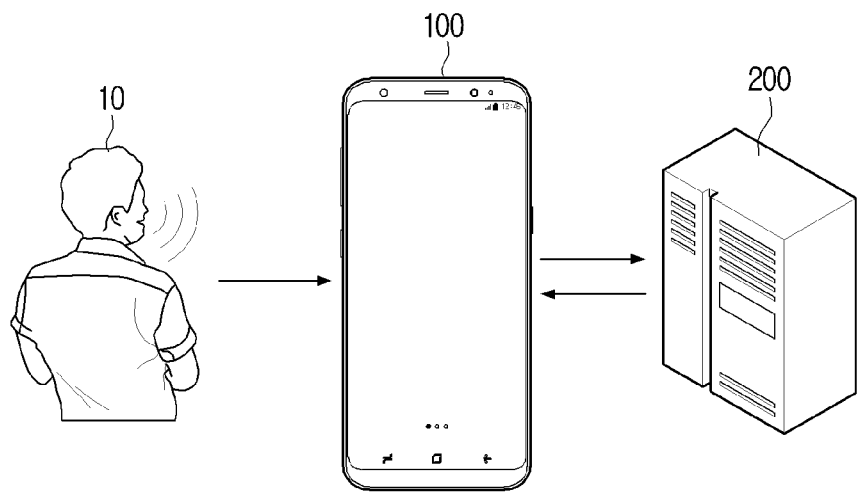
FIG. 1 is a diagram illustrating a conversation system according to one or more embodiments of the disclosure.

Hereinafter, various exemplary embodiments of the disclosure will be described with reference to the accompanying drawings. However, it is to be understood that technologies mentioned in the disclosure are not limited to specific exemplary embodiments, but include all modifications, equivalents, and substitutions according to exemplary embodiments of the disclosure. Throughout the accompanying drawings, similar components will be denoted by similar reference numerals.

In the disclosure, an expression "have," "may have," "include," "may include," or the like, indicates existence of a corresponding feature (for example, a numerical value, a function, an operation, a component such as a part, or the like), and does not exclude existence of an additional feature.

In the disclosure, an expression "A or B," "at least one of A and/or B," "one or more of A and/or B," or the like, may include all possible combinations of items enumerated together. For example, "A or B," "at least one of A and B," or "at least one of A or B" may indicate all of 1) a case in which at least one A is included, 2) a case in which at least one B is included, or 3) a case in which both of at least one A and at least one B are included.

Expressions "first," "second," "1st" or "2nd" or the like, used in the disclosure may indicate various components regardless of a sequence and/or importance of the components, will be used only in order to distinguish one component from the other components, and do not limit the corresponding components.

When it is mentioned that any component (for example: a first component) is (operatively or communicatively) coupled with/to or is connected to another component (for example: a second component), it is to be understood that any component is directly coupled to another component or may be coupled to another component through the other component (for example: a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for," "having the capacity to," "designed to," "adapted to," "made to, or "capable of" depending on a situation. A term "configured (or set) to" may not necessarily mean "specifically designed to" in hardware. Instead, an expression "~an apparatus configured to" may mean that the apparatus "is capable of" together with other apparatuses or components. For example, a "sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

The term "turn" in the context of a voice assistant may refer to an exchange or interaction between a user and the voice assistant (e.g., an artificial intelligence (AI) system adopted in the voice assistant). In a conversational setting between two participants, a turn may represent a specific unit of communication where one participant speaks or interacts, followed by the other participant responding. When a user poses a query or provides a command, it constitutes the user's turn. The voice assistant may process the user's turn and may generate a response, which constitutes the voice assistant's turn.

Meanwhile, conversation history information of the disclosure refers to text information composed of responses of a user in a conversation window and an electronic apparatus. Such conversation history information may be a conversation history between one user and one response bot, or a conversation history between a plurality of users and one response bot. Here, the response bot is an automated machine program that provides a specific service according to a user request. Further, such conversation history information may include not only text information directly received from a user, but also voice signals or text, video, emoticons, etc., which are voice recognition results for the voice signals.

In the disclosure, text information is information having at least one user request and/or slot information corresponding to the user request. Such text information may be referred to as sentence information, command information, request information, query, and the like. The text information may be composed of one sentence or may be composed of a plurality of sentences. In the context of a voice assistant, the term "slot information" may refer to specific pieces of data or parameters that the voice assistant system expects to receive from the user during a conversation or interaction. Slots represent variables or placeholders for different types of information, such as names, dates, locations, numbers, or any other relevant data required to fulfill a user's request.

The user request is a command requesting the performance of a specific service, and the slot information may be an object or additional explanatory information for specifying the corresponding request. For example, in the sentence "TV turn-on," the "turn-on" may be a user request and TV may be slot information. This division is an example, and may be implemented in various ways according to system implementation methods. That is, in the case of classifying the user request in more detail, the above-described "TV turn-on" may be one user request.

In the disclosure, a service is not only a function that may be performed through driving of an application installed in a corresponding device, but also a function that may be performed by using or controlling another device, a function that may be performed by using or controlling a plurality of devices, and the like.

In the disclosure, character data means data excluding numerical data such as real numbers and imaginary numbers, and includes not only data composed of text but also all types of data (e.g., image data, voice data, etc.) capable of converting specific information into numerical values.

Hereinafter, the disclosure will be described in detail with reference to the accompanying drawings.

FIG. 1 is a diagram illustrating a conversation system according to one or more embodiments of the disclosure.

Referring to FIG. 1, a conversation system 1000 may include a user terminal device 100 and a server 200.

The user terminal device 100 may receive conversation content from a user 10 and transmit the received conversation content to the server 200. Here, the conversation content may be text directly input by the user 10 or a voice recognition result obtained by converting a user's uttered voice into text through voice recognition. However, the disclosure is not limited thereto, and according to an example, the conversation content may include text (specifically, sentence), voice, video, emoticon, and the like.

The server 200 may receive the conversation content from the user terminal device 100, and generate response information corresponding to the received conversation content, and transmit the generated response information to the user terminal device 100.

In this case, the server 200 may generate response information using only the current conversation content, generate the response information using only text included in the conversation history information of the current user 10, or generate the response information using the text included in the conversation history information of other users as well as the current user.

For example, when the received conversation content includes the text "Tell me Greek population," the server 200 may determine that user's current request (intent) is a search command and confirm "Greek population" (slot), so it is possible to generate the response information that a search for Greek population is necessary through a search application.

Meanwhile, the current conversation content refers to the conversation content corresponding to a continuous conversation received from the time when a voice wakeup operation is executed to the time when the conversation ends. Accordingly, at least one user request (turn) may be included in the current conversation content. This will be described in detail with reference to FIGS. 4, 5A, and 5B.

Meanwhile, in performing a service corresponding to the user request, when it is difficult to perform a specific service only with the text corresponding to the user's current request or when there are many ways to perform a corresponding request, it may be difficult to perform a specific service.

For example, when the current text included in the received conversation content includes the text "What about Morocco?," it is difficult to understand a user request, so it may be difficult to perform a specific service only with the above-described content.

In this case, the user request may be determined based on the current conversation content including the user's previous request.

For example, when the past request with the text "Tell me Greek population" is identified before the conversation "What about Morocco?" was received, i.e., when a user has previously requested a separate search, the server 200 may generate response information indicating that it is necessary to search for Moroccan population through a search application by confirming that the user request (intent) is a search command and confirming "Moroccan population" (slot) in consideration of not only the currently input conversation content but also the previously input conversation content.

In this way, when information for specifying a user request (i.e., slot information) is included in the user's conversation content, the server 200 can generate response information by utilizing more accurate response information by utilizing the corresponding information.

Meanwhile, as described above, when a user request is understood using conversation content including the user's past request as well as the text corresponding to the user's current request, the server 200 may generate response information for requesting user confirmation in order to secure user stability and reliability. For example, in the case of the above example, before generating response information that the search of Moroccan population is required, it is possible to generate the response information to request the user confirmation, such as "Can you tell me the Moroccan population?."

In this way, when it is difficult to perform a specific service only with the text corresponding to the user's current request, or when there are many ways to perform the request, the server 200 may generate the response information for requesting the user confirmation. However, when such user confirmation is repeated, the user's fatigue may increase and the user satisfaction may decrease.

Accordingly, hereinafter, various embodiments capable of reducing reconfirmation request responses by generating response information for requesting user confirmation only in a specific situation using conversation history information including the user's current conversation content will be described.

Figure 2:
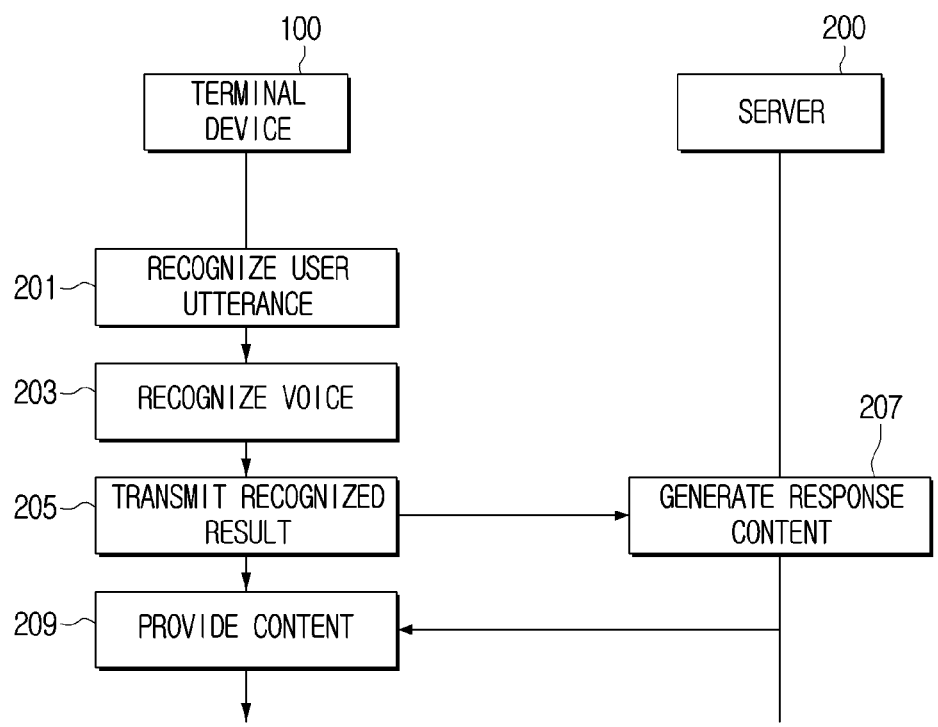
FIG. 2 is a sequence diagram illustrating an operation of the conversation system according to the embodiment of the disclosure.

FIG. 2 is a sequence diagram illustrating an operation of the conversation system according to the embodiment of the disclosure. Specifically, FIG. 2 is a diagram illustrating an example of a conversation system based on a user utterance.

Referring to FIG. 2, when receiving a user utterance from a user (201), the terminal device 100 may voice-recognize the received utterance and generate conversation information (i.e., text) corresponding to the user utterance (203).

When the utterance for the corresponding service is continuously in progress, the terminal device 100 may generate conversation content including the corresponding text and a response from the previous server 200. Meanwhile, such conversation content may be generated on the server 200 side instead of the terminal device 100 side.

Upon generating the text, the terminal device 100 may transmit the conversation content to the server 200 (205).

Upon receiving the corresponding conversation content, the server 200 generates response content corresponding to the corresponding content (207). Specifically, the server 200 may apply the corresponding conversation content to a natural language understanding algorithm to confirm the user's intention and slot, and generate response content corresponding to the confirmed intention and slot.

The server 200 may transmit the generated response content to the terminal device 100 (209). Such response content may be composed of only text or may include text or content information corresponding to a user request.

In addition, the terminal device 100 receiving the response content may perform the corresponding response content.

For example, when the user utters "search for contact A," the terminal device 100 may generate text corresponding to the input utterance and transmit the text to the server 200. Correspondingly, the server 200 may generate response content to search for a contact of "A" in the contact application of the terminal device 100 and provide the generated response content to the terminal device 100.

The terminal device 100 receiving such response content may drive a contact application and provide the contact A to the user by using the corresponding contact application.

Meanwhile, in FIG. 2, an operation example of a voice-based conversation system has been shown and described, but in implementation, the same operation is possible even when the text is directly received from a user. That is, the disclosure may be applied to a conversation system based on a conversation window (or chat window).

Meanwhile, in the illustration and description of FIGS. 1 and 2, in order to perform a conversation service, the user terminal device 100 and the server 200 are shown and described as operating cooperatively, but the above-described functions may be performed in a single device.

Figure 3:
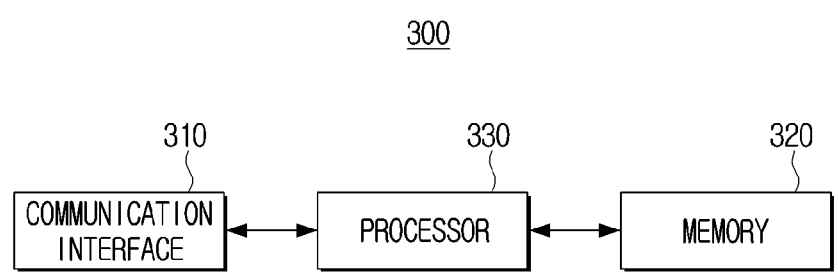
FIG. 3 is a block diagram illustrating a configuration of an electronic apparatus according to one or more embodiments.

FIG. 3 is a block diagram illustrating a configuration of an electronic apparatus according to one or more embodiments.

Specifically, in the system of FIG. 1, an apparatus that directly generates response information, such as a server, an apparatus that collects conversation messages or voices and generates necessary conversation information, such as a user terminal device, and the like may be referred to as an electronic apparatus. That is, the electronic apparatus of FIG. 3 can operate as a user terminal device of FIG. 1 or a server of FIG. 1. In addition, it is also possible to perform the functions of the user terminal device and server of FIG. 1 in one device.

Referring to FIG. 3, according to one or more embodiments, the electronic apparatus 300 may be various devices such as a personal computer (PC), a laptop computer, a smart phone, a tablet, and a server. Referring to FIG. 3, the electronic apparatus 300 may include a communication interface 310, a memory 320, and a processor 330.

The communication interface 310 is formed to connect the electronic apparatus 300 to an external device (not illustrated), and may be connected to the external device through a local area network (LAN) and the Internet network or be connected to the terminal apparatus through a USB port or a wireless communication (for example, wireless fidelity (WiFi), 802.11a/b/g/n, near field communication (NFC), or Bluetooth) port. Such a communication interface 310 may also be referred to as a transceiver.

The communication interface 310 may receive conversation content (or conversation information) from another device or transmit the conversation content to another device. Here, the conversation content may include one user message or messages input through several turns. Here, the user message may be text directly typed by a user, a message obtained by converting the user's uttered voice into text through voice recognition, or voice data corresponding to the user's uttered voice.

The communication interface 310 may transmit the response content (or response information) corresponding to the conversation content to another device that has transmitted the conversation content, or may receive the response content corresponding to the conversation content. Such response content may be information including command information for executing a specific service, content corresponding to information requested by a user, guide information on an execution result of a service requested by a user, or the like.

For example, when the conversation content includes a message requesting execution of a specific application by a user, response content including command information for executing the specific application may be received. However, the above-described example of response content is not one example, and various user requests that may be generated in the conversation system and various responses accordingly may be made.

The memory 320 is a component for storing O/S for driving the electronic apparatus 300, various software, data, and the like. The memory 320 may be implemented in various forms such as RAM, ROM, flash memory, HDD, external memory, and memory card, but is not limited to any one.

The memory 320 may store at least one instruction. These instructions may include instructions for executing an application necessary for performing the above-described conversation system, an application for voice recognition, and various applications for executing a service corresponding to response information.

Conversation history information may be stored in the memory 320. Here, the conversation history information may include not only a current conversation history of a user but also conversation histories of other users. Also, the conversation history information may include the current conversation content of the user as well as the past conversation content of the user.

One or more processors 330 control each component in the electronic apparatus 300. The processor 330 may be composed of a single device such as a central processing unit (CPU) and an application-specific integrated circuit (ASIC), or may be composed of a plurality of devices such as a CPU and a graphics processing unit (GPU).

According to one or more embodiments, when one or more processors 330 receive text input from a user or the user uttered voice, the one or more processors 330 may control the communication interface 310 to generate the conversation content using the input text, and control to transmit the generated conversation content to an external device.

According to one or more embodiments, one or more processors 330 (hereinafter referred to as processors) may generate response information using conversation content received through the communication interface 310 by executing at least one instruction.

According to an example, when the conversation content is received, the processor 330 may use the received conversation content to identify the user request (intent), the slot information, or the like. For example, the processor 330 may identify the user request and/or slot information or the like by analyzing text included in conversation content using a natural language recognition algorithm.

In this case, according to an example, the processor 330 may identify additional information from the received conversation content. For example, the additional information may be time information, conversation frequency, and user emotion information. In addition, the time information may be time information of conversation content, the conversation frequency may be the number of conversation turns or the like to perform a response according to a user request, and the user emotion information may be information inferred through various information such as a user's voice tone or emoticons included in conversation content, and a relationship (boss, husband and wife) with a subject included in the conversation content. In the above, the above-described information is referred to as additional information, but such additional information may be used as the above-described slot information.

According to one or more embodiments, the processor 330 may estimate a user request by confirming a user's current request and previous request in the received conversation content.

According to an example, when it is necessary to confirm the user request corresponding to the current text such as when the reliability of the current request corresponding to the current text included in the conversation content is less than a predetermined value, or when a plurality of user requests of different types are confirmed based on the current text, etc., the processor 330 may estimate the user request by confirming the user's current request and previous request in the received conversation content.

Meanwhile, according to an example, the processor 330 may identify the reliability value corresponding to the confirmed user request based on the conversation history information including not only the conversation content of the current user but also the conversation content of other users, which will be described in detail with reference to FIG. 6.

According to an example, the processor 330 may estimate the user request by confirming the user's previous request (or past request). In performing the service corresponding to the user request, there may be cases in which it is difficult to perform a specific service only with the text corresponding to the user's current request.

For example, when it is difficult to provide a specific service based on the current request, such as when the current text included in the received conversation content includes the text "What about Morocco?" (or when the reliability value of the current request corresponding to the current text is less than the threshold value), the processor 330 may confirm the user's previous request included in the current conversation content. The processor 330 identifies a search command through the search application as the user request included in the previous text when the previous text "Tell me Greek population" is included in the current conversation content, and may estimate the user request corresponding to the current text as the search command based on the identified command. However, the previous request is not confirmed only when it is difficult to perform a specific service based on the current request, and the operation of confirming the current request and the operation of confirming the previous request may be independently performed.

Meanwhile, not only when it is difficult to perform a specific service with only the text corresponding to the user's current request, but also when there are many ways to perform the corresponding request, it may be difficult to perform the specific service.

According to an example, the processor 330 may estimate the user request by confirming the user's current request and previous request, respectively.

For example, when the current text included in the received conversation content includes the text "search for A," the processor 330 may confirm a search command through the search application as a current request. Also, when the previous text "search for contact B" is included in the current conversation content, the processor 330 may confirm a search command through a contact application as a previous request based on a search command included in the previous text. The processor 330 may estimate either the current request or the previous request as the user request.

Alternatively, according to an example, when a plurality of current requests are confirmed, the processor 330) may estimate one of the plurality of current requests as the user request.

For example, when the current text included in the received conversation content includes the text "search for A," the processor 330 may confirm a search command through a search application as a current request, or the processor 330 may confirm a search command through a contact application as a current request. That is, the user request may be confirmed by either A's internet search and A's contact search. In this case, the user request may be estimated based on the preference of the confirmed request. This will be described in detail with reference to FIG. 9.

In this way, when a specific service may not be provided through the current request confirmed based on the current text or when a plurality of user requests are identified, according to an example, the processor 330 may identify either a current request or a previous request, and estimate the identified one request as a user request. This will be described in detail with reference to FIG. 6.

Meanwhile, according to one or more embodiments, the processor 330 may identify whether the estimated user request is a multi-turn request or a single-turn request using the received conversation content. The terms "multi-turn request" and "single-turn request" are also referred to as a multi-turn command and a single-turn command, respectively. In the context of a voice assistant, a single-turn request and a multi-turn request refer to different types of interactions between the user and the assistant.

The multi-turn request refers to a type of a user request that is identified and estimated through the current conversation content and an additional sequent conversation(s). A multi-turn request involves a series of interactions between the user and the voice assistant to accomplish a specific task or gather more information, and may request a conversation with multiple back-and-forth exchanges. The assistant may need to refer to previous questions, or may need to ask follow-up questions or seek clarification to fulfill the user's request. According to an example, the processor 330 may identify the estimated user request as a multi-turn request when the same type of user request is estimated a predetermined number of times or more within the current conversation content. In this case, since the estimated user request is provided to a user through a confirmation request response, the multi-turn request may be a type of user request in which a confirmation request response is provided one or more times within the current conversation content.

On the other hand, a single-turn request refers to a type of a user request that is estimated or identified within the current conversation content without referring to a previous conversation and requiring a subsequent conversation. A single-turn request may be a self-contained request or question issued by the user in a single utterance or turn, and may involve a straightforward request or query that can be answered or executed in a single interaction or in a single turn without requiring any additional back-and-forth conversation.

Here, the type of user request means a type of control command excluding slot information for specifying the user request, and the type of control command includes a type of application that is driven to perform an operation corresponding to the corresponding command.

For example, a "search command through a search application" and a "search command through a contact application" may be different types of user requests. That is, the "search command through the search application" and the "search command through the contact application" are different types of applications (search application and contact application) that are driven to perform the operation corresponding to the corresponding command, and therefore, may be different types of users.

Alternatively, for example, the "search command for A through the search application" and the "command search of B through the search application" each include the same type of control command, except for the fact that the slot information (A and B) for specifying the user request, that is, only the search target is different, so the "search command for A through the search application" and the "search command for B through the search application" may be the same type of user request.

Meanwhile, the multi-turn request and the single-turn request will be described later with reference to FIGS. 5A and 5B.

According to one or more embodiments, the processor 330 may generate confirmation request response information to confirm the estimated user request when the estimated user request is the single-turn request and generate response information including information corresponding to the estimated user request when the estimated user request is the multi-turn request.

For example, it is assumed that the user request is estimated as a contact A search command through the contact application. When the estimated user request is identified as a single-turn request based on the received current conversation content, the processor 330 generates confirmation request response information for confirming the estimated user request, such as "Do you want to search for contact A?." Alternatively, according to an example, when the estimated user request is identified as a multi-turn request, the processor 330 generates response information including a search command for contact A through the contact application without generating separate confirmation request response information. When the user request is identified as a multi-turn request, the processor 330 may choose to bypass the confirmation step for asking the user to confirm the accuracy of the estimation of the user request.

Figure 4:
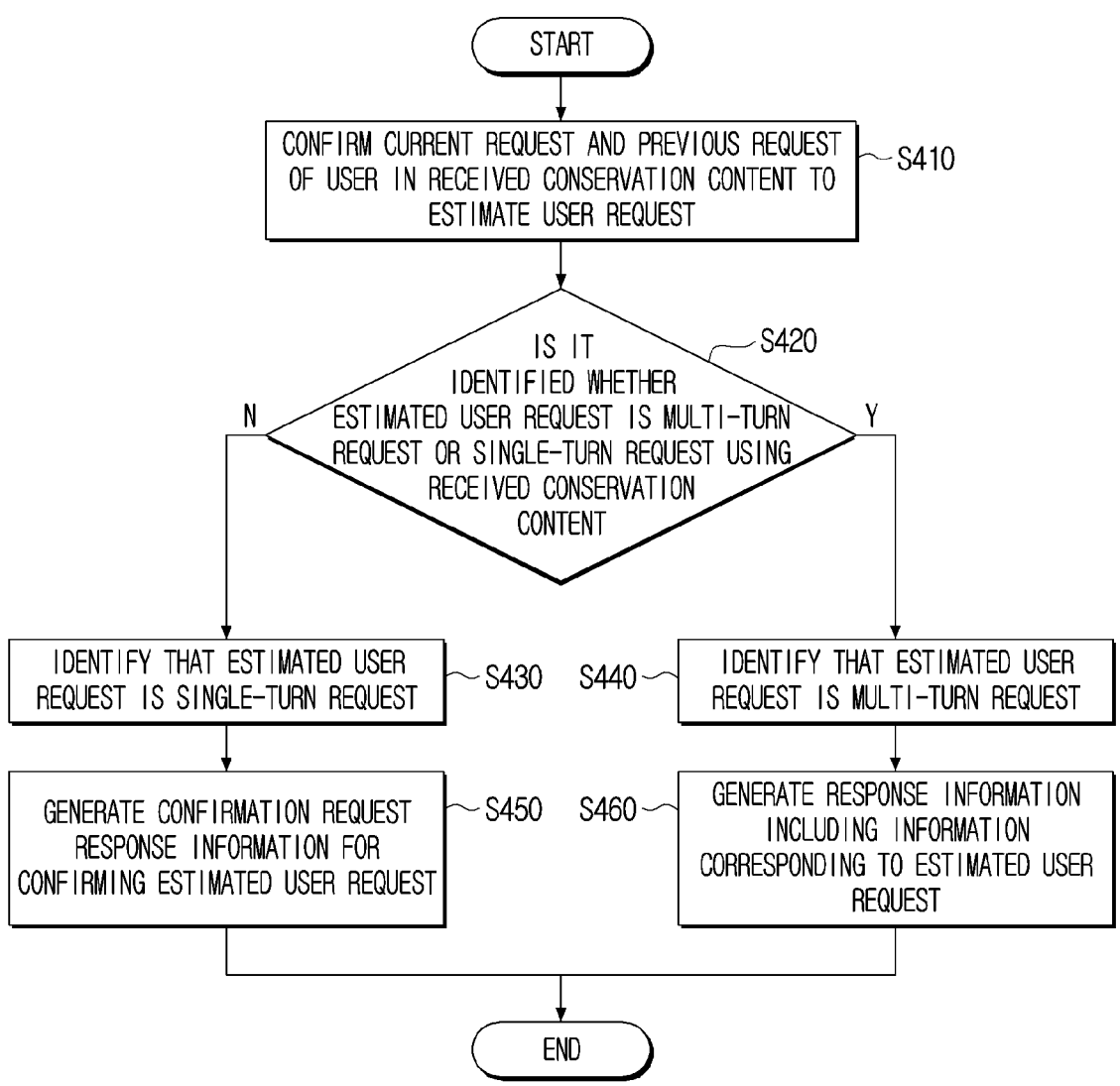
FIG. 4 is a flowchart for describing a method of controlling an electronic apparatus according to one or more embodiments.

FIG. 4 is a flowchart for describing a method of controlling an electronic apparatus according to one or more embodiments.

Referring to FIG. 4, according to one or more embodiments, the control method may include estimating or identifying a user request by confirming the user's current request and previous request in the received conversation content (S410).

For example, the processor 330 assumes a case in which "What about Company C?" is received as the current text. When the text "Tell me salary of company A" has previously been received based on the current conversation content, the processor may identify slot information corresponding to "annual salary of company A" and a user's previous request corresponding to a search command through a search application based on the received text, and may estimate the current request corresponding to a current text as a search command for an annual salary of company C through the search application based on the identification.

Subsequently, according to one or more embodiments, the control method may include identifying whether the estimated user request is a multi-turn request or a single-turn request using the received conversation content (S420).

For example, when the processor 330 receives as a previous text "What about company B?" based on conversation history information including the received current conversation content, and accordingly, identifies that a search command for annual salary of company B through a search application is estimated as the previous user request, the processor may identify the estimated "search company of annual salary of company C through a search application" as a multi-turn request.

For example, whether the estimated user request is the multi-turn request may be identified based on a previous user request, where the user request may be a user request excluding the slot information. That is, in the above example, in order to determine whether the estimated user request is the multi-turn request, the processor 330 may compare only the "search command through the search application" excluding the slot information among the previously estimated user requests with the currently estimated user request, and determine whether the currently estimated user request is the multi-turn request.

However, it is not limited thereto, and according to an example, the processor 330 may determine whether the currently estimated user request is the multi-turn request based on the user request including the slot information.

Subsequently, according to one or more embodiments, when the estimated user request is identified as the single-turn request (S430), the control method may generate the confirmation request response information for confirming the estimated user request (S450). This will be described in detail with reference to FIG. 5B.

Meanwhile, according to one or more embodiments, when the estimated user request is identified as the multi-turn request (S440), the control method may generate response information including information corresponding to the estimated user request (S460).

For example, when the estimated "command to search annual search of company C through a search application"

is identified as the multi-turn request, the processor 330 may generate the response information including the information corresponding to the search command for annual salary of company C through a search application.

According to the above example, when the estimated user request is a previously repeated request, a response corresponding to the user request may be provided immediately without going through a separate user reconfirmation process. As a result, it is possible to prevent the occurrence of fatigue due to user reconfirmation, and improve user satisfaction.

Figure 5A:
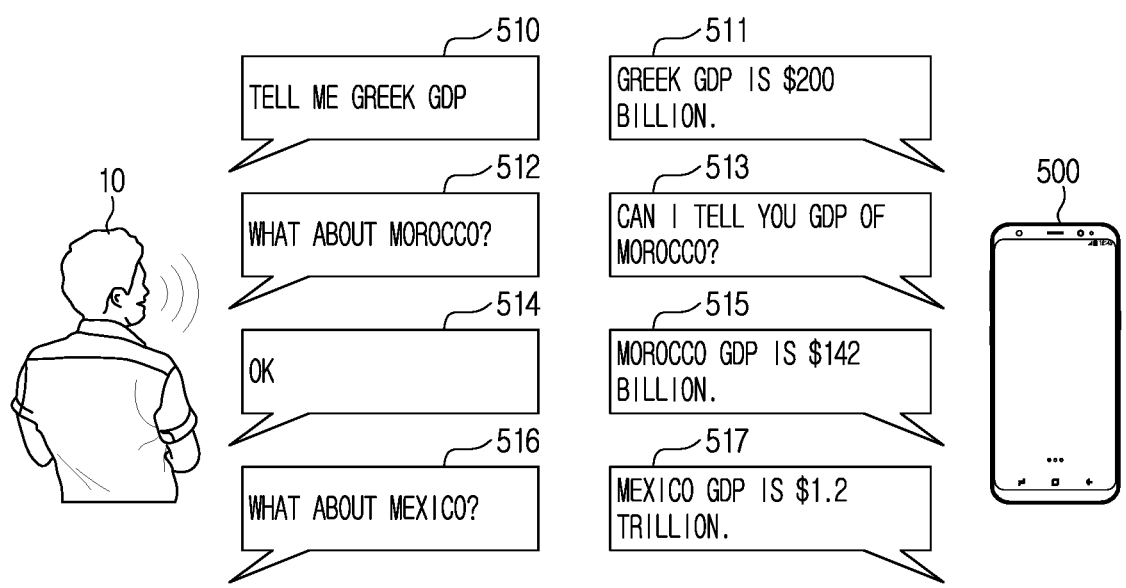
FIG. 5A is a diagram for describing a multi-turn request according to one or more embodiments.

FIG. 5A is a diagram for describing a multi-turn request according to one or more embodiments.

Referring to FIG. 5A, according to one or more embodiments, the processor 330 of an electronic apparatus 500 may identify whether a user request is a multi-turn request or a single-turn request, and generate response information based on the identification. Here, the electronic apparatus 500 is illustrated as a user terminal device for convenience of description, but is not limited thereto, and the electronic apparatus 500 may be implemented as a server according to an example.

For example, the processor 330 may first estimate a user request using the received current conversation content 510 to 516.

For example, as the current request corresponding to the received current text 516 "What about Mexico?" is not confirmed, the processor 330 may confirm the search command through the search application as the previous request based on the previous text 510 "Tell me the Greek GDP" and estimate the user request corresponding to the current text 516 as the "search command for Mexican GDP through the search application."

Subsequently, the processor 330 may identify the estimated user request as a multi-turn request when the same type of user request (e.g., a request for GDP information) is estimated a predetermined number of times or more within the current conversation content, or when a current request (e.g., "What about Morocco?") is identified by referring to another conversation (e.g., a previous conversation such as "Tell me the Greek GDP" or a subsequent conversation). For example, the predetermined number of times may be once, but is not limited thereto, and may be another number of times (e.g., two or more times). The same type of request may refer to requests for information that fall in a common category (e.g., a request for GDP information), but are directed towards different entities or targets (e.g. Greece and Mexico).

For example, when it is identified that the "search command for Moroccan GDP through search application," which is the same type of user request as the user request currently estimated through some 512 to 514 of the current conversation content, is previously estimated, the processor may identify the currently estimated user request as the multi-turn request.

Subsequently, according to one or more embodiments, as the estimated user request is the multi-turn request, the processor 330 may generate the response information including information corresponding to the estimated user request.

For example, when the "search command for Mexican GDP through a search application," which is the estimated user request, is identified as the multi-turn request, the processor 330 may generate the response information corresponding to the estimated user request, and provide a user with a response 517 based on the generated response information.

Figure 5B:
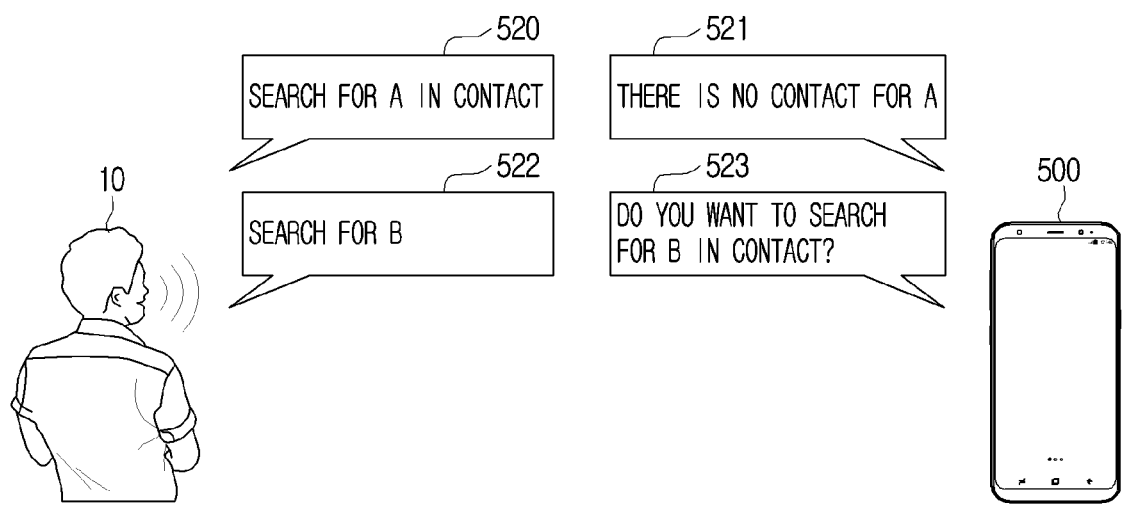
FIG. 5B is a diagram for describing a single-turn request according to one or more embodiments.

FIG. 5B is a diagram for describing a single-turn request according to one or more embodiments.

Referring to FIG. 5B, according to one or more embodiments, the processor 330 of the electronic apparatus 500 may identify whether the user request estimated using the received conversation content is the multi-turn request or the single-turn request, and generate the confirmation request response information based on the identification.

For example, the processor 330 may first estimate a user request using the received current conversation content 520 to 522.

For example, the current request corresponding to the "search for B" which is the received current text 522 may be confirmed as the "search command for B through the search application" or the "search command for B through the contact application," and the previous request may be confirmed as the "search command for A through the contact application" based on the "search for A in contact" which is the previous text 520. In this case, the processor 330 may estimate the current user request as the "search command for B through the contact application" which is the same type request as the previous request among the plurality of current requests.

Then, when the user request of the same type as the estimated user request is estimated or identified within the current conversation content without referring to a previous conversation and requiring a subsequent conversation, the processor 330 may identify the estimated user request as the single-turn request.

For example, when it is identified that the user request of the same type as the user request currently estimated through the current conversation content 520 to 522 has not been estimated, the processor 330 may identify the estimated "search command for B through the contact application" as the single-turn request.

Subsequently, according to one or more embodiments, as the estimated user request is the single-turn request, the processor 330 may generate the confirmation request response information for confirming the estimated user request.

For example, when the "search command for B through the contact application," which is the estimated user request, is identified as the single-turn request, the processor 330 may generate the confirmation request response information for confirming the estimated user request, and may provide "Do you want to search for B in contact?" as the response 517 to the user based on the generated response information.

Figure 6:
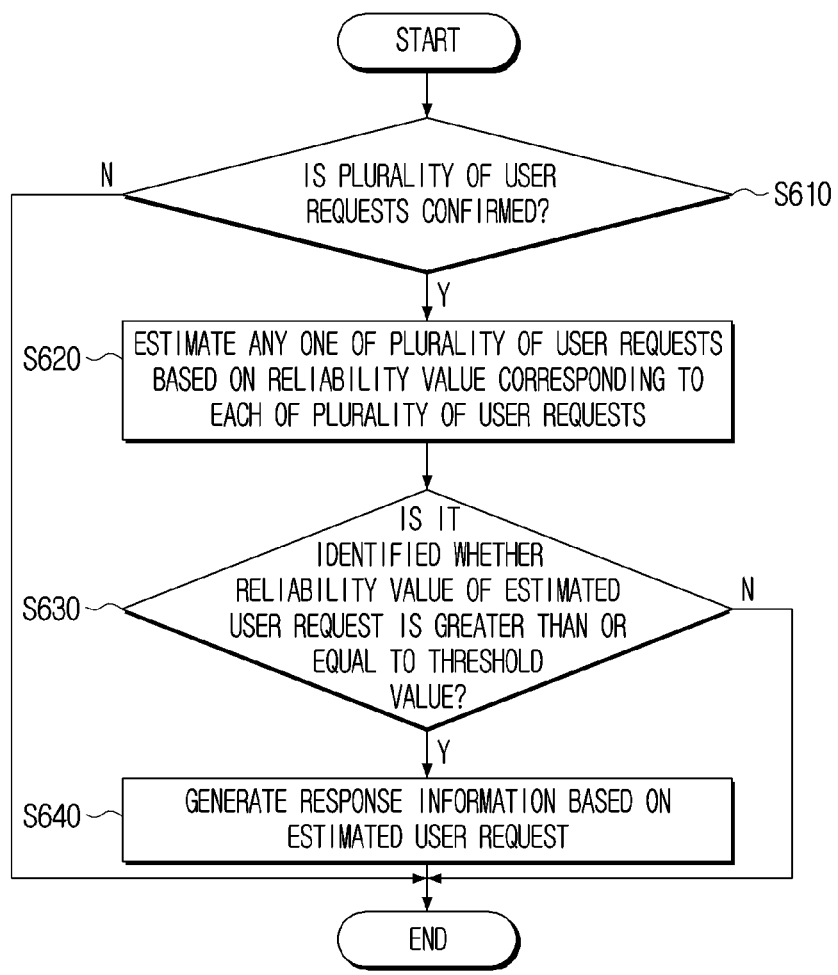
FIG. 6 is a diagram for describing a method of estimating a user request according to one or more embodiments.

FIG. 6 is a diagram for describing a method of estimating a user request according to one or more embodiments.

According to one or more embodiments, when a plurality of user requests are confirmed, the processor 330 may estimate a user request based on a reliability value corresponding to the user request. That is, when the user request needs to be confirmed, such as when the plurality of user requests are confirmed for the current text, the processor 330 may estimate any one user request based on the reliability value corresponding to each of the plurality of user requests.

Referring to FIG. 6, according to one or more embodiments, the control method may first determine whether a plurality of user requests are confirmed (S610).

According to one example, when the current text included in the received conversation content includes the text "search for A," the processor 330 may confirm the "search command through the search application" as a first current request, or the processor 330) may confirm the "search command through the contact application" as a second current request.

However, it is not limited thereto, and it goes without saying that each of at least one current request and at least one previous request may be confirmed.

Subsequently, according to one or more embodiments, the control method may estimate one of a plurality of user requests based on a reliability value corresponding to each of a plurality of user requests (S620).

According to an example, the processor 330 may identify a reliability value corresponding to each of a plurality of confirmed user requests based on conversation history information including not only the conversation content of the current user but also conversation content of other users.

For example, the processor 330 may identify the reliabilities of the "search command through the search application" (first current request) and the "search command through the contact application" (second current request) based on the conversation history information including not only the conversation content of the current user but also the conversation content of other users.

Alternatively, the processor 330 may input the conversation history information to the trained neural network model to identify the reliability value corresponding to the user request.

Here, according to an example, the user's feedback information may include information on a probability that the user provides a positive response when the first current request is provided to the user, but is not limited thereto.

According to an example, when reliability values corresponding to each of a plurality of user requests are identified, the processor 330 may estimate one of the confirmed user requests having the largest reliability value as the user request.

For example, when the reliabilities corresponding to each of the "search command through the search application" (first current request) and the "search command through the contact application" (second current request) based on the conversation history information are identified as 0.8 and 0.9, respectively, the processor may estimate as the user request for providing a user with the "search command through the contact application" (second current request) having a relatively large reliability value.

Then, according to one or more embodiments, the control method may identify whether the reliability value of the estimated user request is greater than or equal to a threshold value (S630). Here, the threshold value may be a value stored in the memory 120 when initially set, but is not limited thereto and may be changed based on a user input.

Subsequently, according to one or more embodiments, the control method may generate the response information based on the estimated user request when the reliability value of the estimated user request is greater than or equal to the threshold value (Y) (S640). According to an example, when the reliability value corresponding to the "search command through the contact application" (second current request) is identified as being greater than or equal to the threshold value of 0.9, the processor 330 may generate the response information corresponding to the "search command through the contact application" (second current request).

Accordingly, the electronic apparatus 300 can estimate a user request that may provide high reliability to the user even when a plurality of user requests are confirmed, so the user satisfaction with the service provided is improved.

Figure 7:
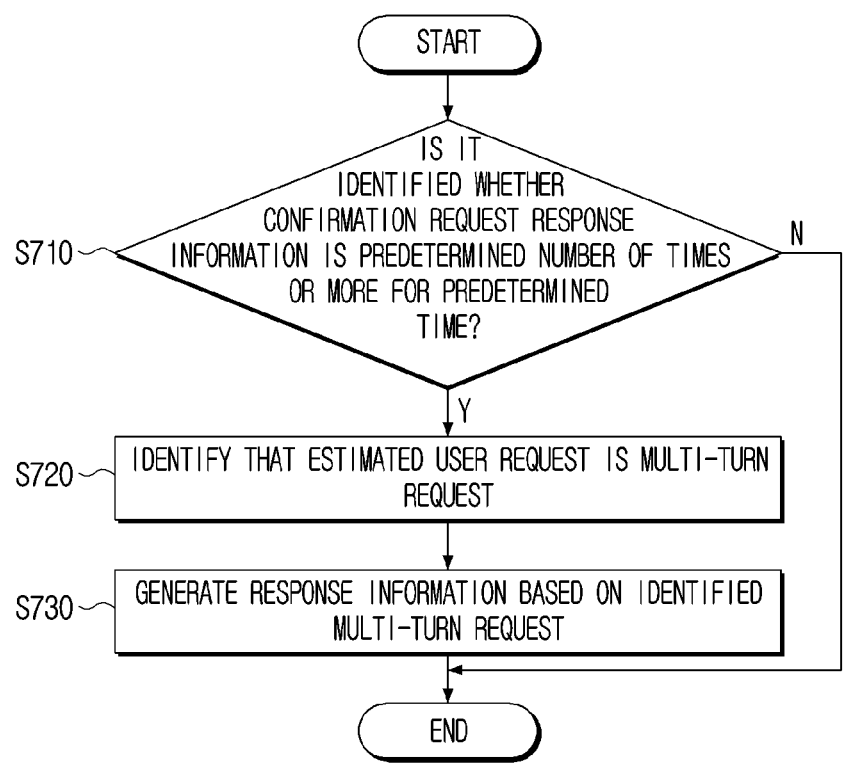
FIG. 7 is a diagram for describing a control method when the multi-turn request is identified according to one or more embodiments.

FIG. 7 is a diagram for describing a control method when the multi-turn request is identified according to one or more embodiments.

According to FIG. 7, according to one or more embodiments, the control method may first identify whether the confirmation request response information is identified the predetermined number of times or more for a predetermined time (S710). Here, according to an example, the predetermined time may be the time from the time when the current conversation content is provided, that is, the time when the voice wakeup operation is executed to the time when the conversation ends. Meanwhile, the predetermined number of times may be, for example, once, but is not limited thereto.

According to an example, when the user request is estimated, the processor 330 may identify whether the confirmation request response information is identified once or more within the current conversation content.

For example, when the "search command for A through the search application" is estimated as the user request, the processor 330 may identify whether the confirmation request response information has previously been generated within the received current conversation content.

In this case, according to an example, the processor 330 analyzes the text of the current conversation content to identify text corresponding to the confirmation request response, for example, interrogative text such as "Can I tell you the contact of B?." thereby identifying whether the confirmation request response information is identified.

Alternatively, according to an example, the processor 330 may identify the confirmation request response information based on history information on the previously generated response information.

On the other hand, in this case, the user request corresponding to the identified confirmation request response information may be of the same type as the estimated user request, but is not limited thereto, and it may also identify whether confirmation request response information corresponding to a user request having a similarity greater than or equal to a predetermined value to the estimated user request is identified one or more times within the current conversation content.

In this case, similarity values corresponding to each of a plurality of user requests may be pre-stored in the memory 320 according to an example, and the processor 330 may identify the confirmation request response information corresponding to the user request having a similarity greater than or equal to a predetermined value to the estimated user request based on the information stored in the memory 320.

Subsequently, according to one or more embodiments, when the estimated user request is identified as the multi-turn request (S720), the control method may generate the response information based on the identified multi-turn request (S730).

According to an example, when the confirmation request response is identified as being provided in the current conversation content, the processor 330 may identify based on the identification that the "search command through the search application" which is the estimated user request is the multi-turn request. Subsequently, as the estimated user request is identified as the multi-turn request, the processor 330 may generate the "search command for A through the search application" as the response information.

Accordingly, when the confirmation request response has been provided to the user within the conversation content, the electronic apparatus 300 may provide a response to the user without going through a separate reconfirmation procedure, thereby improving the user satisfaction.

Figure 8:
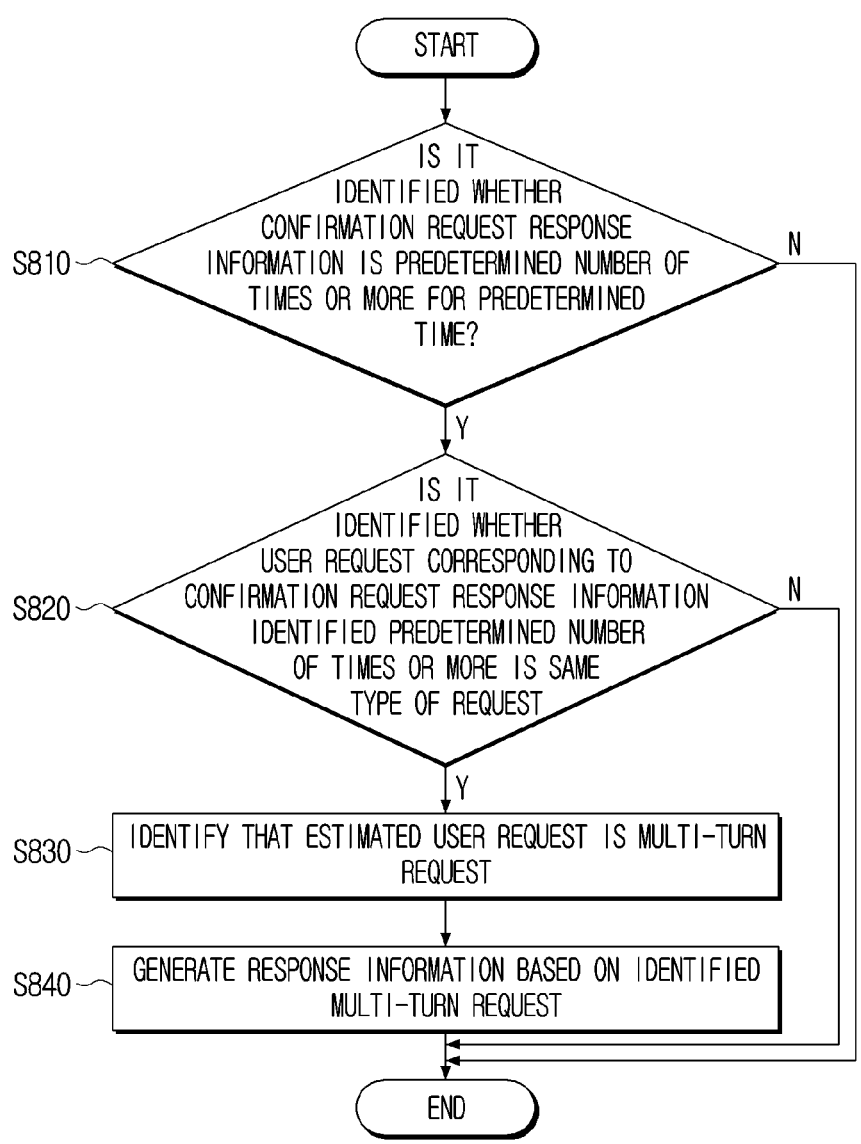
FIG. 8 is a diagram for describing a control method when the multi-turn request is identified according to one or more embodiments.

FIG. 8 is a diagram for describing a control method when the multi-turn request is identified according to one or more embodiments.

Referring to FIG. 8, according to one or more embodiments, the control method may first identify whether the confirmation request response information is identified the predetermined number of times or more for a predetermined time (S810). Here, according to an example, the predetermined time may be the time from the time when the current conversation content is provided, that is, the time when the voice wakeup operation is executed to the time when the conversation ends. Meanwhile, the predetermined number of times may be, for example, once, but is not limited thereto.

According to an example, when the user request is estimated, the processor 330 may identify whether the confirmation request response information corresponding to the same type of user request is estimated once or more within the current conversation content.

For example, when the "search command for A through the search application" is estimated as the user request, the processor 330 may identify whether the "search command through the search application" has been previously estimated based on the received current conversation content.

In this case, according to an example, the processor 330 may identify whether the "search command through the search application" has been previously estimated based on whether the confirmation request response is provided (or whether the confirmation request response information is generated) to provide the "search command through the search application." For example, when the confirmation request response including the text 'Do you want to search for B on the Internet?" is provided within the current conversation content, the processor 330 may identify that the "search command through the search application" has been previously estimated.

Subsequently, according to one or more embodiments, when the estimated user request is identified as the multi-turn request (S820), the control method may generate the response information based on the identified multi-turn request (S830).

According to an example, when the confirmation request response corresponding to the same type of user request as "search command through the search application" which is the estimated user request is identified as being provided in the current conversation content, the processor 330 may identify based on the identification that the "search command through the search application," which is the estimated user request, is the multi-turn request. Subsequently, as the estimated user request is identified as the multi-turn request, the processor 330 may generate the "search command for A through the search application" as the response information.

However, it is not limited thereto, and according to an example, the processor 330 determines that, when the confirmation request responses corresponding to the same type of user request are identified two or more times within the current conversation content, the estimated user request may be identified as the multi-turn request.

Accordingly, when the confirmation request response to the same type of user request has been provided to the user within the conversation content, the electronic apparatus 300 may provide a response to the user without going through a separate reconfirmation procedure, thereby improving the user satisfaction.

Figure 9:
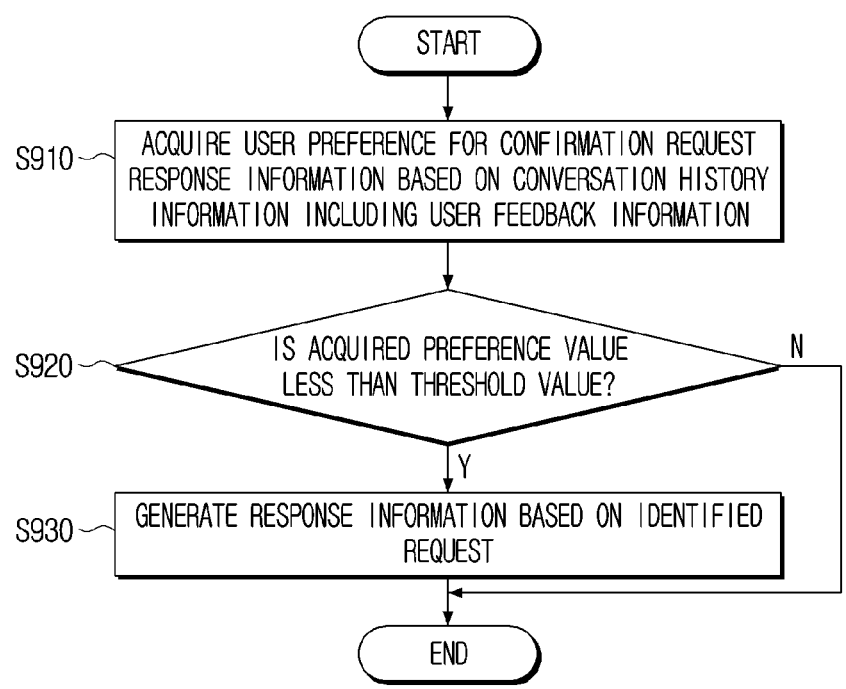
FIG. 9 is a diagram for describing a method of generating response information in consideration of user preference according to one or more embodiments.

FIG. 9 is a diagram for describing a method of generating response information in consideration of user preference according to one or more embodiments.

According to one or more embodiments, the processor 330 may identify user preference for a confirmation request response based on conversation history information including user feedback information. Here, the user preference for the confirmation request response means the user preference of the current user. According to one example, the conversation history information including the user feedback information may be stored in the memory 320.

Here, the user feedback information is information on the user response to the response provided through the electronic apparatus 300, and according to an example, the user feedback information may include information on the user's positive feedback or negative feedback for the response corresponding to the user request. Alternatively, according to an example, the user feedback information may include information about a user's positive feedback or negative feedback for the confirmation request response.

Referring to FIG. 9, according to one or more embodiments, the control method may first acquire the user preference value for the confirmation request response based on the conversation history information including the user feedback information (S910).

According to an example, the processor 330 may calculate a ratio of positive feedback among the user feedback for the confirmation request response based on the information stored in the memory 320 and identify the calculated ratio as the user preference value for the confirmation request response.

Alternatively, according to an example, the processor 330 may identify a user preference value for the confirmation request response through the trained neural network model.

For example, a trained second neural network model may be stored in the memory 320, and the trained second neural network model may be trained to output the user preference information for the confirmation request response as the conversation history information including the user feedback information is input as training data. The processor 330 may input the conversation history information to the trained second neural network model to identify the user preference value for the confirmation request response.

Subsequently, according to one or more embodiments, the control method may identify whether the acquired user preference value is less than a threshold value (S920)).

Then, according to one or more embodiments, when the user preference value for the confirmation request response is identified as being less than the threshold value (Y), the control method may generate the response information based on the identified request (S930).

According to an example, it is assumed that the estimated user request is identified as the multi-turn request based on the received conversation content. In this case, when the current user preference for the confirmation request response is identified as being less than the threshold value, the processor 330 may generate the response information including the information corresponding to the estimated user request.

Meanwhile, according to an example, when the current user preference for the confirmation request response is identified as being greater than or equal to the threshold value, the processor 330 may generate the confirmation request response information for confirming the estimated user request.

That is, in the case of the multi-turn request, the electronic apparatus 300 may provide a response including information corresponding to a user request in consideration of the user preference for the response to the confirmation request only when the user has a preference less than a predetermined value for the confirmation request response.

Meanwhile, according to an example, it is assumed that the estimated user request estimated is identified as the multi-turn request based on the received conversation content. In this case, when the current user preference for the confirmation request response is identified as being less than the threshold value, the processor 330 may generate the response information including the information corresponding to the user request instead of the confirmation request response information.

That is, even in the case of the single-turn request, the electronic apparatus 300 may provide a response including information corresponding to the user request in consideration of the user preference for the confirmation request response.

According to the above example, it is possible to provide the response to the user in consideration of the user preference corresponding to each user for the confirmation request response, thereby improving the accuracy of the provided response.

Meanwhile, returning to FIG. 3, according to one or more embodiments, the processor 330 may generate response information based on a user preference corresponding to a specific user request.

According to one or more embodiments, user preference values corresponding to different types of requests may be stored in the memory 320. Here, the user preference values corresponding to each of the different types of requests is information on the preference of the current user and other users for the user request. According to one example, the user preference value corresponding to the "search command through the search application" may be stored as 0.9 in the memory 320, but this is just an example and a value different therefrom may be stored.

Meanwhile, according to one or more embodiments, the processor 330 may identify the user preference value corresponding to the identified request based on the conversation history information of the current user and other users. In this case, according to an example, the conversation history information may include the feedback information on the identified requests of the current user and other users.

According to an example, it is assumed that "A" is identified as the user request. According to an example, the processor 330 may calculate a ratio of positive feedback among the user feedback for the identified "A" based on the information stored in the memory 320 and identify the calculated ratio as the user preference value for the identified user request "A."

Alternatively, according to an example, the processor 330 may identify the user preference value for the identified user request through the trained neural network model.

For example, a trained third neural network model may be stored in the memory 320, and the trained third neural network model may be trained to output the user preference information for the identified user request as the conversation history information of the current user including the user feedback information and the conversation history information of other users are input as training data. The processor 330 may input the conversation history information of the current user and the conversation history information of other users to the trained third neural network model to identify the user preference value for the identified user request.

Thereafter, according to one or more embodiments, when the identified user preference value is identified as being greater than or equal to the threshold value, the processor 330 may generate the response information based on the identified request. This will be described in detail with reference to FIG. 10 below.

Figure 10:
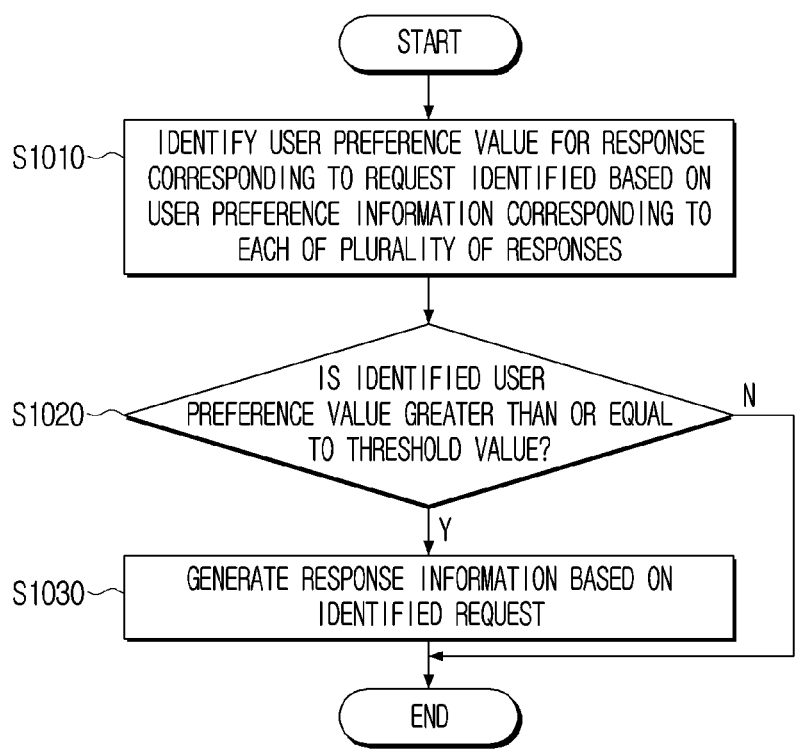
FIG. 10 is a diagram for describing a method of generating response information in consideration of user preference according to one or more embodiments.

FIG. 10 is a diagram for describing a method of generating response information in consideration of user preference according to one or more embodiments.

Referring to FIG. 10, according to one or more embodiments, the control method may first identify a user preference value for a response corresponding to the identified request based on user preference information corresponding to each request of a different type (S1010).

According to an example, it is assumed that the identified request is request "A." The processor 330 may identify the user preference (or a user preference for the request "A") value for the response corresponding to the request "A" based on the information stored in the memory 320.

Alternatively, according to an example, the processor 330 may identify the user preference value for the response corresponding to the request "A" based on the conversation history information, or the processor 330 may input the conversation history information of the current user and other users to the trained third neural network model to identify the user preference value for the response corresponding to the request "A."

Subsequently, according to one or more embodiments, the control method may identify whether the identified user preference value is greater than or equal to a threshold value (S1020).

Subsequently, when the identified user preference value is greater than or equal to the threshold value (Y), the control method according to one or more embodiments may generate the response information based on the identified user request (S1030).

According to one example, when the user preference value for the identified user request "A" is greater than or equal to a threshold value (e.g., 0.9), the processor 330 may generate the response information including information corresponding to the identified request "A".

Meanwhile, in this case, according to an example, the identified user request may be the multi-turn request. For example, when the identified user request is the multi-turn request, the processor 330 may identify the user preference value for the identified multi-turn request, and may generate response information including information corresponding to the estimated user request only when the identified user preference value is greater than or equal to the threshold value.

On the other hand, the reliability is a value used to determine whether the confirmation of the user request is necessary, and the user preference (user preference for a response corresponding to the identified request or user preference for the confirmation request response) is a value used to identify the type of response information. For example, the user preference is a value used by the processor 330 to identify either the confirmation request response information or the response information.

According to the above example, it is possible to provide a response to the user in consideration of the user preference for the type of identified request, thereby securing the user reliability.

Figure 11:
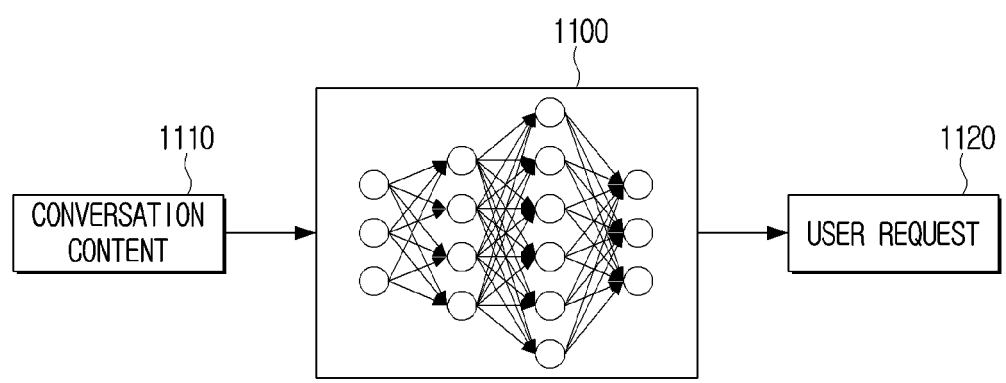
FIG. 11 is a diagram for describing a method of estimating a user request according to one or more embodiments.

FIG. 11 is a diagram for describing a method of estimating a user request according to one or more embodiments.

Referring to FIG. 11, according to one or more embodiments, the processor 330 may estimate a user request 1120 using received conversation content 1110. According to an example, the processor 330 may estimate the user request 1120 using a trained first neural network model 1100.

According to an example, the trained first neural network model may be stored in the memory 320. The trained first neural network model 1100 may be trained to output the user request as conversation content, response information, and feedback information for the response are input as training data.

Here, according to an example, the conversation content may be current conversation content. According to an example, the response information may include the confirmation request response information and response information generated by the processor 330. That is, the response information input as the training data to the trained first neural network model means information on different types of responses output through the electronic apparatus 300 and provided to the user.

On the other hand, the feedback information on the response is information on the user feedback corresponding to the response provided to the user, and according to an example, the feedback information about the response may include information on the positive feedback or negative feedback for the provided response.

According to an example, the processor 330 may input the conversation content 1110 received through the communication interface 310 to the trained first neural network model 1100 to estimate the user request 1120.

For example, the processor 330 may input the conversation content 510 to 570 illustrated in FIG. 5A to the trained first neural network model 1100 to estimate the user request corresponding to the "search command for Mexican GDP through the search application."

Figure 12:
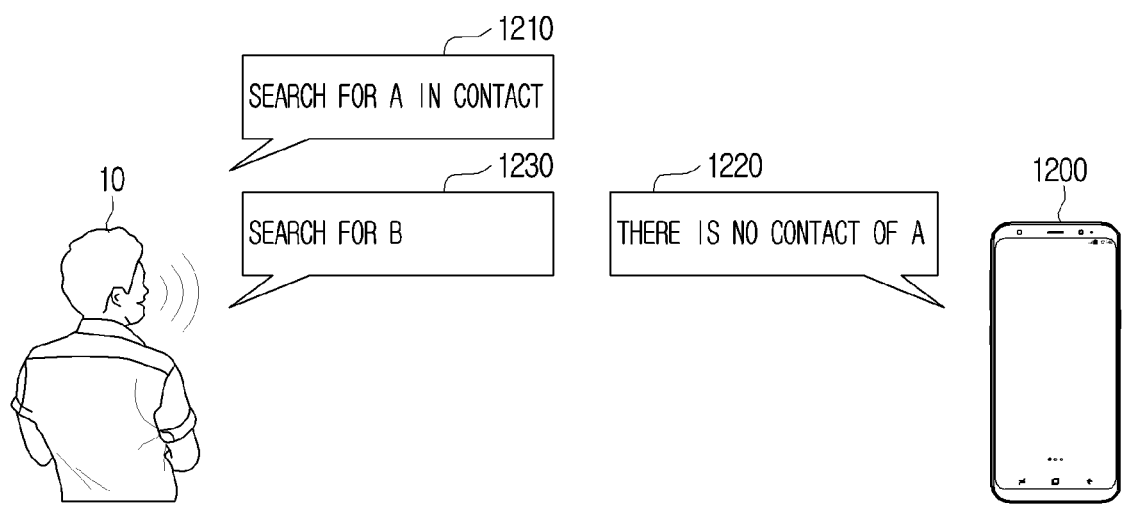
FIG. 12 is a diagram for describing different types of user requests according to one or more embodiments.

FIG. 12 is a diagram for describing different types of user requests according to one or more embodiments.

Here, the electronic apparatus 1200 is illustrated as a user terminal device for convenience of description, but is not limited thereto, and the electronic apparatus 1200 may be implemented as a server according to an example.

Referring to FIG. 12, according to one or more embodiment, the processor 330 may first estimate a first user request based on the user's current request 1230 in the received conversation content 1210 to 1230, and estimate a second user request based on the user's current request 1230 and previous request 1210. Here, the user request includes the first user request and the second user request.

According to an example, the processor 330 may estimate the "search command for B through the search application" as the first user request based on the "search for B" which is the text corresponding to the user's current request. The "search command for B through the contact application" may be estimated as the second user request based on the text "search B" corresponding to the user's current request 1230 and the "search A in contact," which is the text corresponding to the previous request 1310.

Subsequently, according to an embodiment, when the first user request and the second user request are identified as being of different types, the processor 330 may generate the confirmation request response information for confirming either the first user request or the second user request.

According to an example, as the "search command for B through the search application" estimated as the first user request and the "search command for B through the contact application" estimated as the second user request are identified as different types of user requests, the processor 330 may generate the confirmation request response information for confirming either the first user request or the second user request. For example, the processor 330 may generate the confirmation request information corresponding to "Do you want to search for B in contact?," which is the text for confirming the second user request.

Meanwhile, returning to FIG. 3, according to an embodiment, when a plurality of current requests are identified, the processor 330 may estimate one of the plurality of current requests based on the type of the previous request.

According to an example, in the case of the "search for B" which is the received current text, the corresponding current request may be confirmed as the "search command for B through the search application" or the "search command for B through the contact application," and the previous request may be confirmed as the "command to search for A through the contact application" based on the "search for A in contact". In this case, the processor 330 may estimate the current user request as the "search command for B through the contact application" which is the same type of request as the previous request among the plurality of current requests. The same type of request may refer to requests for information that fall in a common category (e.g., "requests to search the contact application"), but are directed towards different entities or targets (e.g., "A" and "B").

In this way, when a plurality of requests for user utterance are confirmed, an order of a candidate group may be differentiated in consideration of the previous request.

Meanwhile, according to one or more embodiments, when a plurality of multi-turn requests are identified, the processor 330 may identify one of the plurality of identified multi-turn requests using a conversation sequence within the received conversation content, and generate response information based on the identified multi-turn requests. Here, the conversation sequence means a generation sequence of text included in the conversation content over time. For example, in the case of FIG. 5A, a conversation sequence is generated in an order of "Tell me Greek GDP," "Greek GDP is xx," and "What about Morocco?" . . . "What about Mexico?."

According to an example, when a plurality of types of user requests estimated one or more times exist in the current conversation content, the plurality of multi-turn requests may be identified. In this case, the processor 330 may identify the multi-turn request corresponding to a user request which is relatively latest in the generation order by using the conversation sequence in the received conversation content.

For example, when the user request "A" and the user request "B" are each estimated once within the current conversation content, that is, when a confirmation request response corresponding to the user request "A" and a confirmation request response corresponding to the user request "B" are each provided once, the plurality of multi-turn requests "A" and "B" may be identified. In this case, the processor 330 may identify the multi-turn request corresponding to the user request "B" which is relatively late in the generation order by using the conversation sequence.

Subsequently, according to an example, the processor 330 may generate the response information based on the identified one of a plurality of multi-turn requests.

Accordingly, the electronic apparatus 300 may provide a response that meets the user's intention even when the plurality of multi-turn requests are identified in consideration of the conversation context or conversation sequence. As a result, the user satisfaction is improved.

Meanwhile, when a plurality of user requests are identified according to an embodiment, the processor 330 may generate each response information including information corresponding to the plurality of user requests.

According to one example, when the plurality of multi-turn requests are identified, the processor 330 may generate first response information including information corresponding to any one of the plurality of identified multi-turn requests and provide a user with the generated first response information in a first method, and generate second response information including information corresponding to the other one of the identified plurality of multi-turn requests and provide a user with the generated second response information in a second method. Here, the first method may be a voice output method through a speaker (not illustrated) according to an example, and the second method may be a text output method through a display (not illustrated).

For example, the processor 330 may generate first response information including information corresponding to any one of the plurality of identified multi-turn requests, and the user terminal device 100 may use the generated first response information to output a voice corresponding to the first response information through a speaker (not illustrated). In addition, the processor 330 may generate second response information including information corresponding to the other of the plurality of identified multi-turn requests, and the user terminal device 100 may use the generated second response information to display a response corresponding to the second response information through a display (not illustrated) together with the current conversation content.

In this case, according to an example, the processor 330 may generate UI information so that the response (or text) corresponding to the second response information is displayed at the bottom of the screen, and transmit the generated UI information to the user terminal device 100.

Meanwhile, the first response information and the second response information may be identified based on reliability corresponding to each response information and user preference for a user request corresponding to each response information according to an example.

For example, the processor 330 may identify response information corresponding to a user request having a relatively large reliability value among a plurality of user requests as first response information, and identifies response information corresponding to a relatively small user request as second response information.

Alternatively, for example, the processor 330 may identify the response information corresponding to the estimated first user request as the first response information, and identify the response information corresponding to the estimated second user request as the second response information.

Alternatively, for example, the processor 330 may identify response information corresponding to a user request having relatively large user preference values corresponding to each of the plurality of user requests as the first response information, and response information corresponding to a user request having relatively small user preference values as the second response information.

Figure 13:
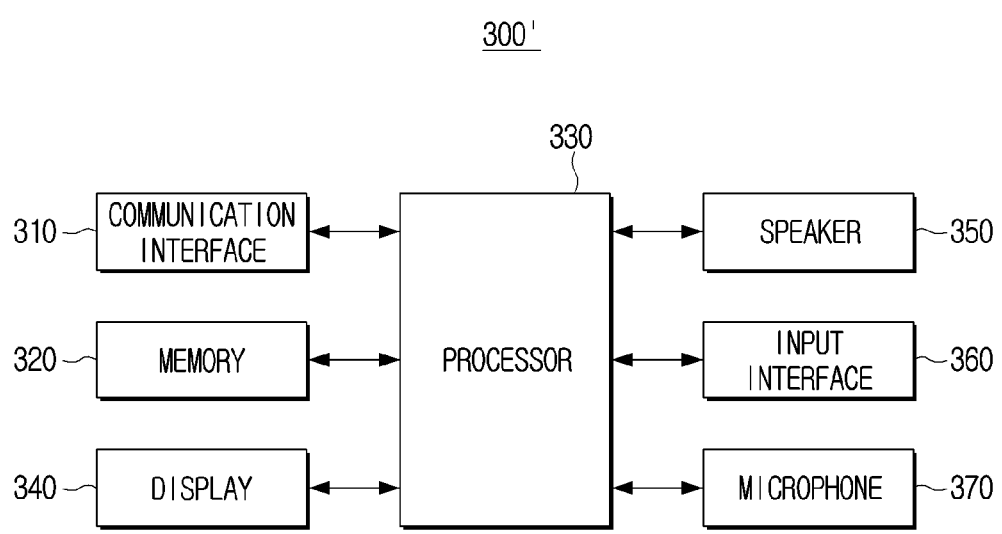
FIG. 13 is a block diagram illustrating a detailed configuration of an electronic apparatus according to one or more embodiments.

FIG. 13 is a block diagram illustrating a detailed configuration of an electronic apparatus according to one or more embodiments.

Referring to FIG. 13, according to an embodiment, an electronic apparatus 300' may include a communication interface 310, a memory 320, a processor 330, a display 340, a speaker 350, an input interface 360, and a microphone 370. Among those, descriptions of components overlapping with those illustrated in FIG. 3 will be omitted.

The display 340 displays a user interface window for selecting a function supported by the electronic apparatus 300'. Specifically, the display 340 may display a user interface window for selecting various functions provided by the electronic apparatus 300'. The display 340 may be a monitor such as a liquid crystal display (LCD) and organic light emitting diodes (OLED), and may be implemented as a touch screen capable of simultaneously performing some functions of the input interface 360 to be described later.

The display 340 may display content corresponding to response information or current conversation history information.

Alternatively, according to an example, the display 340 may display a UI including text corresponding to the second response information.

The speaker 350 outputs sound. The speaker 350 may output response information corresponding to the received response message as sound.

For example, when the electronic apparatus 300' is implemented as an AI speaker, the processor 330 may convert a user's uttered voice input through a microphone into text, and transmit the converted text to the external server 200. When the response information is received from the external server 200, the text corresponding to the received response information may be output through the speaker 350 using a TTS function.

The input interface 360 may select the function of the electronic apparatus 300' and receive the control command for the corresponding function from the user. The input interface 360 may be a keyboard, a mouse, a touch pad, or the like, and may include a microphone for receiving a user's voice.

In addition, the electronic apparatus 300' continuously monitors whether or not the voice of the predetermined trigger command is input, and when it is determined that the input user's uttered voice includes the predetermined trigger command, the processor 330 may execute the conversation service as described above.

In addition, the electronic apparatus 300' may receive a similar trigger name similar to the currently set trigger command from an external device, and when determining whether or not the trigger command is included, use the trigger name set by the user as well as the similar trigger name together to determine whether or not the conversation service is started.

For example, the current command notifying the start (or wake-up) of the conversation system of the electronic apparatus 300' is "Hi Bixby", but when the frequency of other users using "Hi Big~" and "Hi Bix~" is high, the server 200 may provide the information on the corresponding similar name to the terminal device 100 so that the conversation service may be triggered even in the user utterance corresponding to "Hi big~" or "Hi Bix~" even in a specific user terminal device 100.

The electronic apparatus 300' receiving such similar trigger information may store the similar trigger information in the memory 320 and use not only the trigger command set by the user but also the similar trigger command when determining whether to start the utterance service.

The microphone 160 may refer to a module that acquires sound and converts the acquired sound into an electrical signal, and may be a condenser microphone, a ribbon microphone, a moving coil microphone, a piezoelectric element microphone, a carbon microphone, or a micro electro mechanical system (MEMS) microphone. In addition, it may be implemented in non-directional, bi-directional, unidirectional, sub-cardioid, super-cardioid, and hyper-cardioid methods.

According to the above example, when the estimated user request is a previously repeated request, a response corresponding to the user request may be provided immediately without going through a separate user reconfirmation process. As a result, it is possible to prevent the occurrence of fatigue due to user reconfirmation, and improve user satisfaction.

Meanwhile, terms "~er/or" or "module" used in the disclosure may include units configured by hardware, software, or firmware, and may be used compatibly with terms such as, for example, logics, logic blocks, components, circuits, or the like. The "unit" or "module" may be an integrally configured component or a minimum unit performing one or more functions or a part thereof. For example, the module may be configured by an application-specific integrated circuit (ASIC).

Various embodiments of the disclosure may be implemented by software including instructions stored in a machine-readable storage medium (for example, a computer-readable storage medium). A machine is a device capable of calling a stored instruction from a storage medium and operating according to the called instruction, and may include the electronic apparatus (for example: electronic apparatus 300) of the disclosed embodiments. In the case in which the above-described command is executed by the processor, the processor may directly perform a function corresponding to the command or other components may perform the function corresponding to the above-described command under a control of the processor. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A method of controlling an electronic apparatus, the method comprising:
obtaining a conversation content from a user;
identifying whether a user request is a multi-turn request that has a same request type as the previous request or a single-turn request based on the conversation content;
generating a confirmation request to request the user to confirm the user request based on the user request being identified as the single-turn request; and
omitting a generation of the confirmation request and generating a response corresponding to the user request based on the user request being identified as the multi-turn request that has the same request type as the previous request.

2. The method as claimed in claim 1, further comprising:
identifying that the user request is the multi-turn request when the multi-turn request having a same type of request is identified a predetermined number of times or more for a predetermined time based on the conversation content; and
generating the response corresponding to the user request based on the multi-turn request.

3. The method as claimed in claim 2, wherein the same request type corresponds to requests for information that fall in a common category, and are directed to different entities or targets.

4. The method as claimed in claim 1, further comprising:
when a plurality of multi-turn requests are identified, identifying one of the plurality of identified multi-turn requests using a conversation sequence within the conversation content, and
wherein the generating of the response comprises: generating the response based on the one multi-turn request.

5. The method as claimed in claim 1, wherein the estimating comprises:
when a plurality of user requests are confirmed, one of the plurality of user requests is estimated based on reliability values corresponding to each of the plurality of user requests, and
wherein the generating of the response comprises: when the reliability value of the user request is greater than or equal to a threshold value, generating the response based on the user request.

6. An electronic apparatus, comprising:
a communication interface;
a memory configured to store at least one instruction; and
one or more processors configured to generate response information based on conversation content received through the communication interface by executing the at least one instruction to:
identify whether a user request is a multi-turn request that has a same request type as a previous request, or a single-turn request based on the conversation content;
generate a confirmation request to request a user to confirm the user request based on the user request being identified as the single-turn request; and
omit a generation of the confirmation request and generate a response corresponding to the user request based on the user request being identified as the multi-turn request that has the same request type as the previous request.

7. The electronic apparatus as claimed in claim 6, wherein the one or more processors are further configured to execute the at least one instruction to:
identify that the user request is the multi-turn request when the multi-turn request having the same request type is identified a predetermined number of times or more for a predetermined time based on the conversation content, and generate the response corresponding to the user request based on the multi-turn request.

8. The electronic apparatus as claimed in claim 7, wherein the same request type corresponds to requests for information that fall in a common category, and are directed to different entities or targets.

9. The electronic apparatus as claimed in claim 6, wherein, when a plurality of multi-turn requests are identified, the one or more processors are further configured to execute the at least one instruction to:
 identify one of the plurality of identified multi-turn requests using a conversation sequence within the received conversation content, and
 generate the response corresponding to the user request based on the identified one multi-turn request.

10. The electronic apparatus as claimed in claim 6, wherein, when a plurality of user requests are confirmed, the one or more processors are further configured to execute the at least one instruction to estimate one of the plurality of user requests based on reliability values corresponding to each of the plurality of user requests, and
 when the reliability value of the user request is greater than or equal to a threshold value, the response is generated based on the user request.

11. The electronic apparatus as claimed in claim 6, wherein the one or more processors are further configured to execute the at least one instruction to:
 generate the confirmation request or the response based on at least one of a user preference for the confirmation request and a user preference for the response.

12. The electronic apparatus as claimed in claim 11, wherein the one or more processors are further configured to execute the at least one instruction to:
 acquire a user preference value for the confirmation request based on conversation history information including user feedback information,
 when the obtained preference value is identified as being less than a threshold value, the response is generated based on the identified request, and
 the user feedback information includes at least one of feedback information on the response and feedback information on the confirmation request.

13. The electronic apparatus as claimed in claim 11, wherein the memory further includes user preference information corresponding to different type of requests, respectively, and
 the one or more processors are further configured to execute the at least one instruction to identify a user preference value for a response corresponding to the user request based on the user preference information stored in the memory, and
 when the user preference value is identified as being greater than or equal to a threshold value, the response is generated based on the user request.

14. The electronic apparatus as claimed in claim 6, wherein the memory stores a trained first neural network model,
 the trained first neural network model is trained to output the user request as conversation content, response information, and feedback information for the response are input as training data, and
 the one or more processors are further configured to execute the at least one instruction to input the conversation content received through the communication interface to the trained first neural network model to estimate the user request.

15. The electronic apparatus as claimed in claim 6, wherein the user request includes a first user request and a second user request,
 the one or more processors are further configured to execute the at least one instruction to:
 estimate the first user request based on the user's current request within the received conversation content,
 estimate the second user request based on the user's current request and previous request, and
 generate the confirmation request for identifying either the first user request or the second user request when the first user request and the second user request are identified as different types.

16. The electronic apparatus as claimed in claim 6, wherein the one or more processors are configured to identify the multi-turn request as the same type request as the previous request when the multi-turn request and the previous request seek a same type of information for a different target, using a same software application.

17. The electronic apparatus as claimed in claim 6, wherein the one or more processors are configured to identify the multi-turn request as the same type request as the previous request when the one or more processors have provided a response to the previous request, which seeks the same request type as the multi-turn request at a current time point.

* * * * *